L. BUTLER.
AUTOMATIC BATTERY REFILLING DEVICE.
APPLICATION FILED MAY 22, 1917.
1,354,800.
Patented Oct. 5, 1920.
2 SHEETS—SHEET 1.
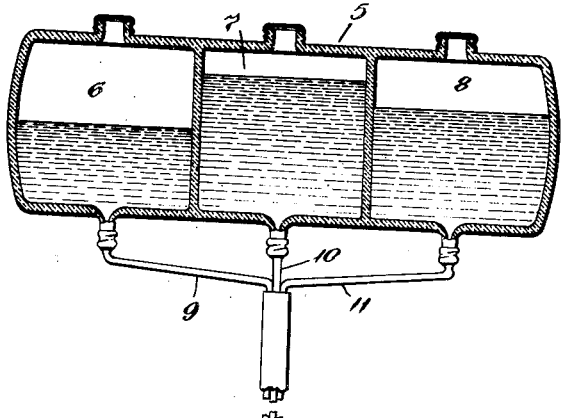
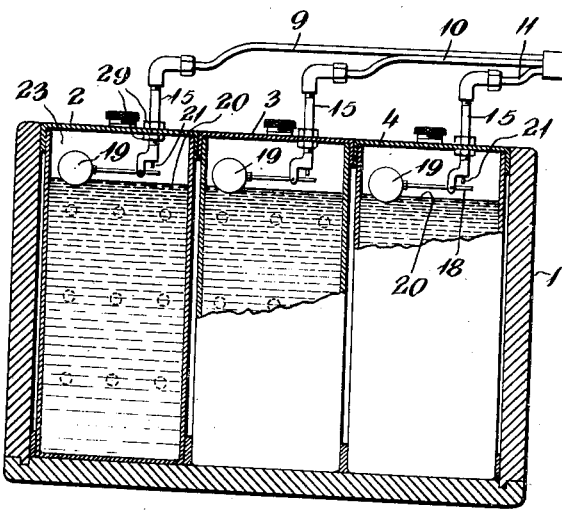
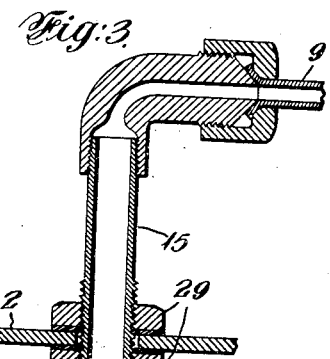
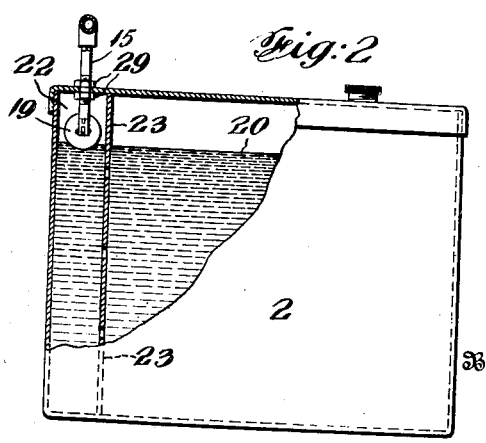
Inventor
Lamar Butler
By his Attorney L. BUTLER.
AUTOMATIC BATTERY REFILLING DEVICE.
APPLICATION FILED MAY 22, 1917.
1,354,800.
Patented Oct. 5, 1920.
2 SHEETS—SHEET 2.
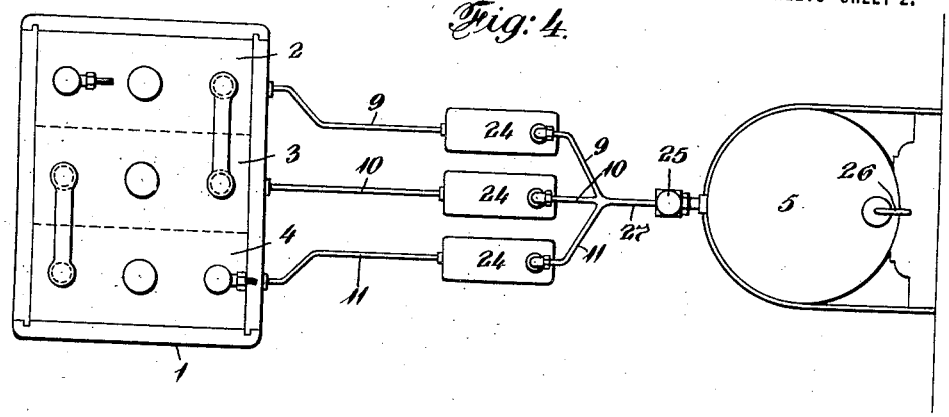
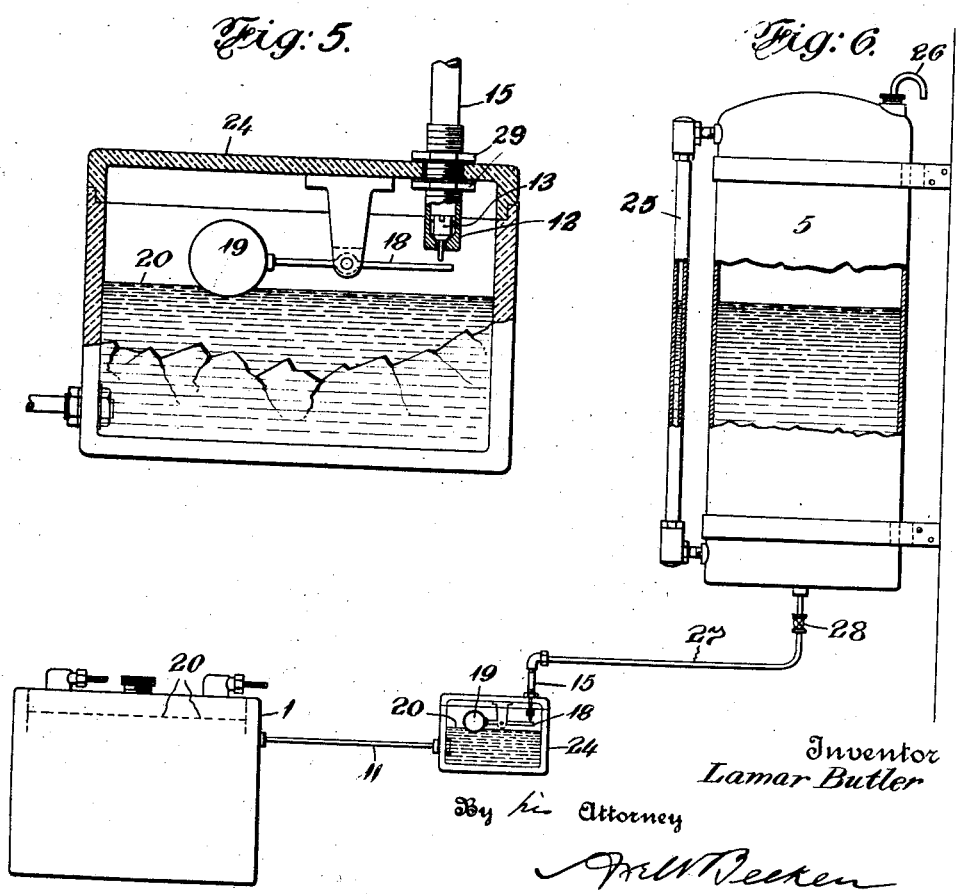
Inventor
Lamar Butler
By his Attorney

UNITED STATES PATENT OFFICE.

LAMAR BUTLER, OF DARIEN, CONNECTICUT.

AUTOMATIC BATTERY-REFILLING DEVICE.

1,354,800.  Specification of Letters Patent.  Patented Oct. 5, 1920.

Application filed May 22, 1917. Serial No. 170,334.

*To all whom it may concern:*

Be it known that I, LAMAR BUTLER, a citizen of the United States, and a resident of Darien, county of Fairfield and State of Connecticut, have invented certain new and useful Improvements in Automatic Battery-Refilling Devices, of which the following is a specification.

This invention relates generally to electric batteries and particularly relates to means for automatically replenishing the individual cells of a battery with liquid to replace the losses that occur through evaporation or other causes and thereby maintain the volume and the specific gravity of the electrolyte in each cell constant.

The extensive use of storage batteries in the automobile art in connection with the operation of starting and ignition systems in cars driven by gasolene engines, as well as in connection with electrically driven vehicles, and the consequent necessity for intrusting the care of the batteries to operators not particularly well skilled in their care and use, have frequently resulted in the injury of the batteries because of the failure of the operators to replace losses in the battery liquid as fast as they occur. As is well known, the proper operation of the batteries requires, not only that the composition of the electrolyte be kept up to a certain standard for which purpose hydrometer tests of the battery liquid are made from time to time, but also that the level of the liquid be maintained sufficiently high to insure that the plates are covered with electrolyte. Any lowering of the liquid below this level results in a decrease in the efficiency of operation and a substantial uncovering of the plates by the liquid may result in serious injury to the battery. It will be seen that the gradual evaporation of liquid from the battery which is constantly taking place tends to lower the level of the electrolyte and it is customary to replace the liquid lost through evaporation with distilled water which is added to the cells at intervals as required. It, however, frequently occurs that, because of the usually, inaccessible location of the batteries, their need of attention is overlooked and the addition of the necessary distilled water is neglected. The main object of the present invention is to provide for the automatic replenishing of the individual battery cells in accordance with their needs and directly as the losses occur.

With this and other objects in view the invention consists in the provision of means associated with each individual battery cell and controlled by the level of the electrolyte therein to automatically supply liquid thereto.

In the accompanying drawings, in which two concrete embodiments of the invention are shown, Figure 1 is a vertical longitudinal section of a battery equipped with automatic refilling devices embodying the invention together with a supply reservoir also shown in vertical section.

Fig. 2 is a side view partly in elevation and partly in section and showing a compartment for the valve controlling mechanism.

Fig. 3 is an enlarged sectional view showing in detail a float operated valve device used in the apparatus.

Fig. 4 is a plan view of a modified form of the invention.

Fig. 5 is a side view partly in elevation and partly in section showing a continued valve and liquid level indicating chamber used in the modification of the invention shown in Fig. 4.

Fig. 6 is a view partly in elevation and partly in vertical section of the modification shown in Fig. 4.

In the particular embodiment of the invention shown in Fig. 1 of the drawing, a battery 1 which may be of the storage type has a plurality of separate cells 2, 3 and 4 which are arranged to be automatically supplied with distilled water from the supply tank 5 to keep the level of the electrolyte in each individual cell constant. The supply tank 5 is preferably provided with separate compartments 6, 7 and 8 corresponding respectively to the individual battery cells 2, 3 and 4. Between the compartments of the supply tank and the corresponding cells, supply conduits 9, 10 and 11 are provided and the outlet end of each supply conduit is adapted to be controlled by a suitable float operated valve 12 to provide for the the supply of water from each conduit to the corresponding cell.

The construction of the controlling valve 12 is best shown in Fig. 3 of the drawing and it will be seen that a valve member 13 is adapted to co-act with the valve seat 14 in the lower end of the terminal member 15 of one of the supply conduits. Normally, the valve member 13 is in engagement with its valve seat so that water cannot pass through the outlet port 16 into the cell. Supported in a bracket 17 carried by the lower end of the terminal member 15 is a valve actuating arm 18 carrying at one extremity a float member 19 which is adapted to be supported by the liquid 20 in the cell. As will be obvious, the lowering of the level of the liquid which is brought about by evaporation or other causes will allow the float 19 to descend and this will raise the opposite end 18 into engagement with the stem 21 of the valve member 13 to lift the valve from its seat and permit liquid to pass from the conduit into the cell to again raise the level of the liquid therein. As will be seen, this action is wholly automatic and a fresh supply of liquid is supplied to the cell in exact accordance with the losses of liquid therein and as fast as the losses occur so that the volume of liquid in the cell is maintained constant.

Preferably, each cell is provided with a compartment 22 in which the valve mechanism described is housed. This compartment is formed by means of a perforated division plate 23 which is secured adjacent one end of the cell, the perforations in the plate serving to establish such communication between the cell proper and the valve compartment that the composition and volumes of the bodies of liquid therein are the same.

As is well known, it is necessary that the individual cells of the battery be kept separate so that there will be no intermingling of the contents thereof and for this reason each individual cell is provided with its own valve operating mechanism, so that the operation of maintaining the volume of liquid in each cell constant is wholly independent of the condition of the electrolyte in any other cell.

In order that the operator of a vehicle on which the device is used may be constantly informed of the condition of the battery, the supply reservoir 5 is preferably made of transparent material such as glass and is mounted on the dashboard where it can be readily observed. The tank is separated into the individual compartments 6, 7 and 8 and the condition of the individual cells can be observed so that an unusually large supply of liquid to one of the cells, such as might be occasioned by a serious leak, would be detected by the operator before any great injury to the battery could result therefrom.

In the modified form of the invention shown in Figs. 4 and 6 of the drawing, the valve mechanism for controlling the supply of distilled water to the individual cells in lieu of being mounted in compartments within the cells themselves is mounted in individual feed reservoirs 24 through which the water passes from the supply tank 5 to the battery 1. The feed reservoirs 24 are preferably made of transparent material so that they serve to indicate the level of the liquid therein and they are mounted in such relation to the battery 1 that the level of the liquid in the battery and in the feed reservoirs is the same. In this case as in the modification shown in Fig. 1, there is a valve mechanism individual to each one of the cells 2, 3 and 4 of the battery 1. By this arrangement it will be seen that no modification of the battery structure is entailed and the refilling device can be used in conjunction with ordinary batteries such as are in common use.

It will be seen that an indication of the condition of the individual cells of the battery is afforded by means of the individual feed reservoirs 24 and, in addition, in order that the amount of water present in the main supply reservoir 5 may be known at all times, a sight gage 25 is provided and mounted in such position that it can be readily seen by the operator.

An inlet duct 26 is preferably mounted in the upper part of the supply reservoir through which air may pass as the water is drawn therefrom. In the single supply conduit 27, which passes from the lowermost portion of the supply tank 5 to the conduit branches 9, 10 and 11, a valve 28 is preferably placed in order that the supply of water from the tank 5 may be cut off when there is occasion to overhaul the batteries or their controlling valve mechanism.

In order to determine the level at which the electrolyte is to stand in the individual cells, the terminal member 15 in the supply conduits may be vertically adjusted in the cover members thereof by means of the adjusting nuts 29, as is shown in Fig. 3 of the drawing.

It will be seen that a battery refilling device has been provided which will automatically replenish the individual cells of the battery with distilled water to make up for the losses that are constantly occurring therein through evaporation and that the supply of water to each individual cell is wholly independent of the supply to any other cell. Furthermore, the employment of sight gages provides the means for keeping the operator constantly informed of the condition of the individual cells so that the risk of injury which is likely to occur through neglect in the ordinary operation of batteries of this type is overcome. While the use of distilled water has been constantly referred to in the description of the invention, it is obvious that any other suitable liquid could be used if desired.

I claim:

1. A battery comprising: a plurality of non-communicating cells containing bodies of liquid of substantially the same relative level, means including automatic devices for the independent replenishment of the liquid contents of any cell controlled by changes in the level of the liquid in the particular cell to be replenished and means for determining the level at which the liquid in the individual cells is to stand.

2. A battery comprising: a plurality of non-communicating cells containing bodies of liquid of substantially the same relative level, means including automatic devices for the independent replenishment of the liquid contents of any cell actuated by the lowering of the level of the liquid in the particular cell to be replenished, means for determining the level at which the liquid in the individual cells is to stand and means extraneous of the cells for indicating the liquid level in each cell.

Signed at Darien, in the county of Fairfield and State of Connecticut, this 17th day of May, 1917.

LAMAR BUTLER.